United States Patent [19]
Kimura et al.

[11] Patent Number: 5,522,923
[45] Date of Patent: Jun. 4, 1996

[54] RED PIGMENT AND MANUFACTURING METHOD THEREOF

[75] Inventors: Asa Kimura; Fukuji Suzuki, Japan; Akiko Sato, all of Yokohama, Japan

[73] Assignee: Shiseido Co., Ltd., Tokyo, Japan

[21] Appl. No.: 124,460

[22] Filed: Sep. 22, 1993

[30] Foreign Application Priority Data

Sep. 22, 1992 [JP] Japan .................................. 4-277897

[51] Int. Cl.⁶ .................................................. C09C 1/22
[52] U.S. Cl. ........................ 106/418; 106/415; 106/459; 427/419.3
[58] Field of Search .................... 106/418, 459, 106/415; 427/419.3

[56] References Cited

U.S. PATENT DOCUMENTS

| | | | |
|---|---|---|---|
| 4,435,220 | 3/1984 | Watanabe et al. | 106/415 |
| 4,780,140 | 10/1988 | Franz et al. | 106/20 |
| 4,840,677 | 6/1989 | Ostertag | 106/456 |
| 5,059,250 | 10/1991 | Burow et al. | 106/459 |
| 5,244,649 | 9/1993 | Ostertag et al. | 106/415 |
| 5,273,576 | 12/1993 | Sulliuan et al. | 106/418 |

FOREIGN PATENT DOCUMENTS

| | | |
|---|---|---|
| 0417567 | 8/1990 | European Pat. Off. . |
| 0453261 | 4/1991 | European Pat. Off. . |
| 0522678 | 3/1992 | European Pat. Off. . |
| 01261573 | 10/1989 | Japan . |

OTHER PUBLICATIONS

Chemical Abstracts, vol. 112, No. 14, Apr. 2, 1990, Abstract No. 120724s, p. 99, T. Katamoto, et al.

*Primary Examiner*—Karl Group
*Assistant Examiner*—Scott Hertzog
*Attorney, Agent, or Firm*—Townsend & Banta

[57] ABSTRACT

A red pigment comprising: an iron oxide plate type particle, an aluminum compound layer which contains at least aluminum oxide and which is formed on the iron oxide particle, and the optical thickness of the aluminum compound layer being 150–500 nm. The red pigment according to the present invention has excellent color tone with high chroma from the orange to the blue red and moreover, and excellent stability.

7 Claims, 2 Drawing Sheets

RED PIGMENT AND MANUFACTURING METHOD THEREOF

FIELD OF THE INVENTION

This invention relates to a red pigment and the manufacturing method thereof and, more particularly, to an improvement of a red pigment and the manufacturing method thereof comprised of inorganic materials.

BACKGROUND OF THE INVENTION

A red pigment is used in various fields such as cosmetics, paint for automobiles, general paints, plastics, ink, synthetic leather, prints, sundries, furnitures, ornaments, and fabrics.

There are many conventional red pigments which contain a red organic substance, such as carmine. However, conventional red pigments have various negative qualities, such as discoloring of organic substances, and further are unsafe for the human body.

On the other hand, a red pigment containing a red iron oxide as an inorganic red pigment is well-known. Examples of red pigments which are composed of inorganic substances are lamella mica particles in which a surface is coated with the red iron oxide, a titanium dioxide coated mica particle in which the iron oxide is further coated, and plate-type red iron oxide.

An inorganic red pigment composed of a red iron oxide has various merits, such as being safe and sunproof. However, the red pigment composed of the aforementioned red iron oxide is limited from a red color to a brown-red color, which is the color of the iron oxide itself. Also, the conventional inorganic red pigments do not have the various red-like hues, like organic pigments.

It is, however, possible to change the color tone of a pigment, e.g. by coating the surface of the mica particle with the red iron oxide and inorganic substances which have other color tones. In this case, the mixture of the material of more than one substance must be coated on the surface of the mica particle. However, this type of coating treatment is difficult to achieve since the mixture of the substances causes a problem in that the hues gradually become black because each material absorbs light and the lightness of the pigment notably declines.

SUMMARY OF THE INVENTION

It is an object of the present invention to eliminate the problems of the prior art and to provide a red pigment which is comprised of inorganic substances which present high lightness, has the color tone of vivid red, and a method of manufacturing the same.

As a result of studies undertaken by the present inventors so as to achieve these goals, it has been found that it is possible to obtain a red pigment by forming a red iron oxide like plate and coating the plate-type red iron oxide with an aluminum compound. On the basis of these findings, the present invention has been achieved.

The first embodiment of the present invention contains a red pigment comprising;

an iron oxide plate-type particle;

an aluminum compound layer which contains at least aluminum oxide and which is formed on the iron oxide plate type particle; and the aluminum compound layer having an optical thickness of 150–500 nm.

The second embodiment of the present invention is comprised of a red pigment, as set forth in the first embodiment of the present invention, and further comprising;

an iron oxide layer which is formed on the plate-like particle;

the iron oxide layer having an optical thickness of 60–350 nm; and the aluminum compound layer having an optical thickness of from about 150–500 nm.

The third embodiment of the present invention comprises a red pigment according to the first embodiment of the present invention, and wherein said aluminum compound layer contains 1–20 weight % of iron oxide and/or a compound of iron oxide-alumina.

The fourth embodiment of the present invention, comprises a manufacturing method of a red pigment according to the first embodiment of the present invention wherein said aluminum compound layer containing 1–20 weight % of iron oxide and/or a compound of iron oxide-alumina; and further comprises;

forming an iron oxide coated plate-type particle of which the content of the coated iron oxide is from 20 to 100 weight % based on the plate-type particle by coating the plate-type particle using a coating bath containing a precursor of the iron oxide according to a precipitator method;

forming an aluminum compound coated iron oxide coated plate-type particle of which the content of the aluminum compound is from 15 to 60 weight % based on the iron oxide coated plate-type particle by coating the iron oxide coated plate-type particle using a coating bath containing a precursor of the aluminum compound according to a precipitator method; and heating the aluminum compound coated iron oxide coated plate-type particle at 100°–900° C.

In the fifth embodiment of the present invention, there is provided a manufacturing method comprising the fourth embodiment of the present invention, characterized in that a precursor of iron oxide is added to the coating bath of aluminum compound so as to be 1 to 20 weight % of the iron oxide and/or iron oxide-aluminum compound for the iron oxide coated plate-type particle.

The composition of the present invention is explained in detail hereinafter.

The plate-type iron oxide in the present invention can be obtained from iron oxide plate-like particles. However, it is preferable to coat a plate particle with the iron oxide. Examples of plate particles are muscovite mica, biotite, gold mica, synthetic mica, red mica, lithia mica, talc, kaolin, sericite, plate-type silica, plate-type alumina, plate-type titanium dioxide, plate-type iron oxide, mica titanium aluminum flake powder, and stainless powder. It is also possible to use commercially available iron oxide coated mica as the intermediate of the red pigment of the present invention.

The particle diameter of the plate-type particles are not particularly limited. However, the red pigment of the present invention is preferably used as the pigment in general industrial products, such as cosmetics. As for the plate-type particles, it is preferable to use particles in which the particle diameter is from about 1–50 μm and the shape is as flat as possible to obtain a beautiful red color.

An example of the iron oxide which is used to coat the plate-type particles as an intermediate when manufacturing the red pigment of the present invention is iron oxide of which the color thereof is from red to brown and $\alpha\text{-}Fe_2O_3$ and $\gamma\text{-}Fe_2O$ can be cited. The plate-type particle is coated with a single type of iron oxide, or equal to, or consisting of more than two kinds of mixtures thereof.

Also, iron oxide hydrate FeO(OH) or black iron oxide ($Fe_3O_4$) which will be oxidized to $Fe_2O_3$ in the heating process can be used.

The optical thickness of the iron oxide layer is preferably 60–350 nm. In cases where the diameter of the plate-type particle is 1–50 μm, the content of the iron oxide is 20–100 weight % based on 100 weight % of the plate-type particle and preferably 30–80 weight %.

If the content of the coating of iron oxide is less than 20 weight %, the red color tone tends to become weak. If the content of the iron oxide is over 100 weight %, the color tone of the iron oxide is too emphasized and it is preferable that the color tone not be brown, which is the color tone of the iron oxide itself.

The optical thickness of the layer means the product of the index of refraction and the geometrical thickness of the layer.

On the other hand, the aluminum compound which is used in the present invention contains aluminum oxide $Al_2O_3$ as an essential ingredient. In addition, aluminum oxide hydrate $Al_2O_3(H_2O)$, $Al_2O_3(3H_2O)$ and aluminum hydroxide, and so on may be mixed.

The optical thickness of the aluminum compound layer is preferably 150–500 nm. In case where the diameter of the plate-type particle is 1–50 μm, the aluminum compound content is 15–60 weight % based on 100 weight % of the iron oxide coated plate-type particle as the intermediate and, preferably 20–40 weight %.

In the case where the content of the aluminum compound is less than 15 weight % based on 100 weight % of the iron oxide coated plate-type particle, it is not possible to adjust the color tone of the original iron oxide. Also, if the content of the aluminum compound is over 60 weight %, the notable decline of chroma may happen.

In the case where the content of the aluminum compound is equal to or less than 25 weight % based on 100 weight % of the plate-like particle, which is coated with the iron oxide as an intermediate, an orange color tome is obtained. In the case where the content of the aluminum compound is 25–40 weight %, a blue-red color tone is obtained. In the case where the content of aluminum compound is equal to or more than 40 weight %, a yellow-red color tone is obtained.

In the coating process of the aluminum compound to iron oxide coated plate-type particle as the intermediate of the present invention, the heating temperature is 100°–900° C. and, preferably, 300°–800° C. If the heating temperature exceeds 900° C., particle agglutination may occur.

Moreover, if iron oxide and/or a compound of iron oxide-alumina are mixed in the aluminum compound, it is possible to further improve the chroma of the red pigment. The content of the iron oxide and/or iron oxide-oxide of aluminum compound is 1 to 20 weight %, and preferably 5 to 15 weight %.

With the method of manufacturing the red pigment according to the present invention, it is possible to use the following method.

Namely, (1) dispersing in water the commercially available particle of muscovite pigment, after gradually adding an aqueous solution of iron salt such as iron chloride (I), iron chloride (II), iron sulfate (I), iron sulfate (II), iron nitrate (I) and iron nitrate (II) and an alkaline aqueous solution, such as a solution of sodium hydroxide and potassium hydroxide into the dispersed water while keeping the pH constant; coating hydrated iron oxide on the surface of the plate-type particle by neutralization decomposition, and heating at 300°–800° C.

(2) Dispersing in water the commercially available particle of muscovite pigment; adding an aqueous solution of iron salt such as iron chloride (I), iron chloride (II), iron sulfate (I), iron sulfate (II), iron nitrate (I), iron nitrate (II), and urea; heating at 80°–100° C. for neutralization; coating the plate-type particle with iron oxide hydrate, and heating at 150°–800° C.

(3) Vaporizing the iron compound at a high temperature and directly coating iron oxide on the plate-type particle.

The following are methods of coating the iron oxide coated intermediate of the present invention with the aluminum compound:

(1) Dispersing the iron oxide coated plate-type particle in water; gradually adding a water solution of aluminum salt, such as aluminum chloride, aluminum sulfate and aluminum nitrate and alkaline solution such as a solution of sodium hydroxide, potassium hydroxide while keeping the pH of the system constant; coating hydrated aluminum oxide by neutralization decomposition, and heating at 150°–700° C.

(2) Dispersing the iron oxide coated plate-type particle in water; adding an aqueous solution of iron salt, such as aluminum chloride, aluminum sulfate, aluminum nitrate and urea; heating at 80°–100° C. for neutralization decomposition; coating the plate-type particle with hydrated aluminum oxide, and heating at 150°–800° C.

Also, as an example of mixing iron oxide and/or a compound of iron oxide-alumina into the aluminum compound, in coating the iron oxide coated plate-type particle with the aluminum compound which contains aluminum oxide, a water solution of the iron salt is mixed with a water solution of aluminum salt and coating by the neutralization decomposition is carried out as described above.

The red pigment according to the present invention as above-mentioned uses the aluminum compound for adjusting the color tone of the red iron oxide. Namely, conventional pigments contained substances which absorbed light components having a certain wavelength and reflected light components having the other wavelength. Accordingly, if the conventional pigment is radiated by white light, which is the aggregate of the light component having various wavelengths, and the light component with the specified wavelength in the white light is absorbed by the pigment. Therefore, the color tone of the above pigment is determined by the reflected light which is the complementary color to the absorption light.

Namely, in the case of the red iron oxide, the brown-red color, which is the color of the iron oxide corresponds to the reflected light. It is then necessary to add a substance which absorbs light, giving the other wavelength to the pigment for adjusting the color of the pigment.

However, in this case, an absorption wavelength area is magnified. The color tone of the pigment gradually changes to achromatic color and the chroma declines.

Therefore, the present inventors used the interference operation of the light and adjusted the color tone of the iron oxide. Namely, the surface of the plate-type particle is coated with the iron oxide and this iron oxide coated particle is coated with the aluminum compound. In this case, the pigment structure is described as shown in FIG. 1.

In FIG. 1, the shape of the mica 10 is plate-like, and the iron oxide 12 is coated on the plate-type mica 10.

The layer 14 of the aluminum compound, which contains aluminum oxide, is coated around the iron oxide layer 12. The aluminum compound 14 and the mica 10 is white and the transmittance of the light is high. Also, the iron oxide layer 12 has brown-red color as described above.

If the white light 16 is irradiated on the pigment, a part of irradiation light 16 becomes the white reflected light 18 which was reflected on the surface of the aluminum compound layer 14. Also, a portion of light having a certain wavelength area is absorbed by the iron oxide and the reflected lights 20, 22, which were reflected on the surface of the mica 10 and the surface of the iron oxide layer 12, respectively, and the reflected lights 20, 22 become the brown-red light.

The white reflected light 18 and the red reflected lights 20, 22 cause interference, and the light component having the specific wavelength of the red reflected lights 20, 22 is emphasized. Therefore, a reflected light (the interference light) with sharp color tone can be obtained.

As is clear from FIG. 2, the white reflected light 18 and the red reflected lights 20, 22 have an optical path difference which depend on the layer thickness of the aluminum compound layer 14. In the reflected lights 20, 22, the light component having a wavelength as shown in FIG. 2(A), and the light component having the same wavelength in reflected light 18, have optical path differences (L: about twice that of the aluminum compound layer). Accordingly, a part of the peak of the light component of the red reflected lights 20, 22 is situated on a part of the trough of the light component of white light 18. As a result, both light components deny each other and they disappear as shown in the FIG. 2(C).

However, as shown in FIG. 2(D), in the case where the light component has a half wavelength compared to FIG. 2(a), the light component of white reflected light 18 and the red reflected lights 20, 22 are shifted from each other for 1 wavelength. Therefore, a portion of both the peak and of the trough of the curve overlapped and amplitude of vibration amplification occurs as shown in the FIG. 2(F).

As a result, only the light with the specific wavelength of red reflected lights 20, 22 is emphasized and can produce a color tone more distantly sharp than the reflected light of iron oxide itself.

As described above, the aluminum compound is coated by the red pigment in the invention. However, the light transmittance of the aluminum compound is very high. Therefore, the total quantity of light of reflected lights 18, 20, 22 scarcely declines in comparison to the case where the pigment is mixed with more than one substance, and the chroma never notably declines.

In the present invention, the color tone is adjusted by the interference operation. Therefore, the optical path difference generates the interference operation and becomes an important aspect of the present invention. As is clear from FIG. 2, when the optical path difference becomes a half wavelength of the light component, the light strength of this wavelength area decreases. On the other hand, when the optical path difference becomes the same or an integer magnification length of the wavelength of the light component, the light strength of this wavelength area increases. Therefore, it is necessary to adjust the path length in order to adjust the strength of the visible light area by the optical path difference.

In the example shown in FIG. 1, reflected light 18 was a white light. However, if the aluminum compound contains iron oxide and/or iron oxide-oxide of aluminum compound, reflected light 18 becomes a red light. As a result, it is possible to adjust the tone of color with the interference operation of the red reflected lights 18, 20,22, and it becomes possible to improve the chroma.

As mentioned above, the red pigment of the present invention utilizes the interference of light which depends on the layer thickness of the aluminum compound layer 14. As a result, the color tone, lightness and chroma of the red pigment is substantially improved. Moreover, the red pigment is manufactured from inorganic substances which contain the iron oxide and the aluminum compound. Therefore, it provides excellent stability, safety, sunproofing, acid resistance, alkali resistance, solvent resistance, heat resisting property and so on.

EXAMPLES

Figure 1:
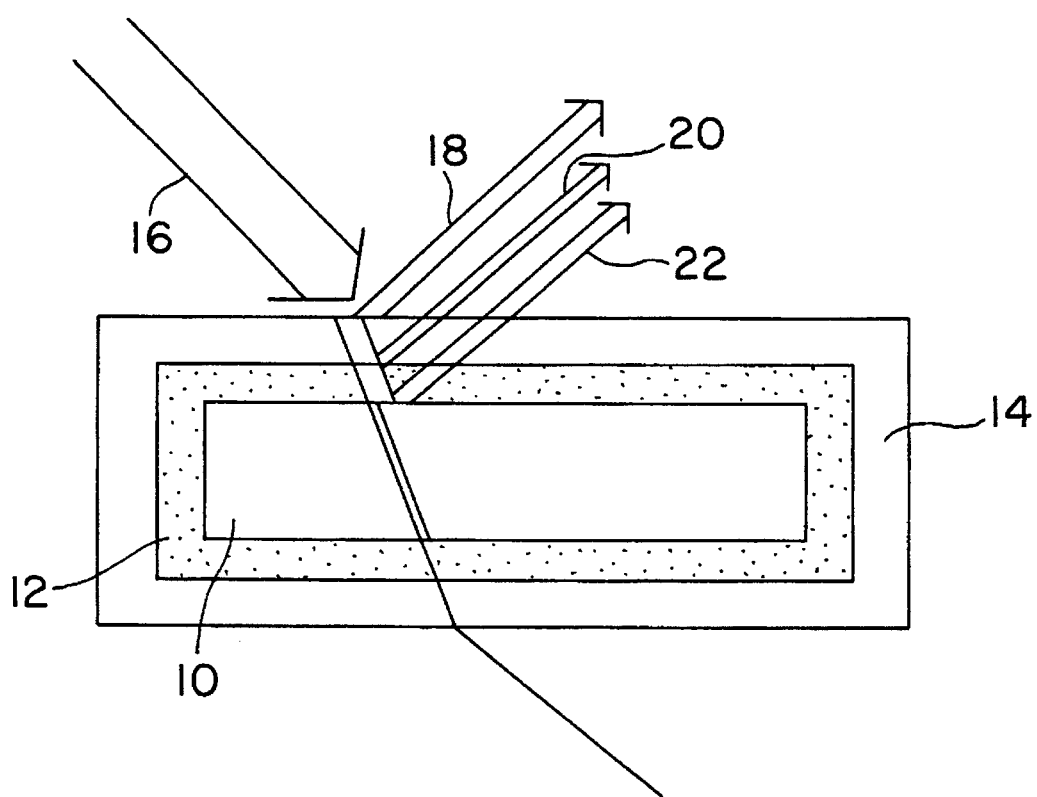
FIG. 1 and FIG. 2 are the explanation views which show the color tone adjustment operation of the red pigment according to the present invention.
Figures 2A, 2B, 2C, 2D, 2E, 2F:
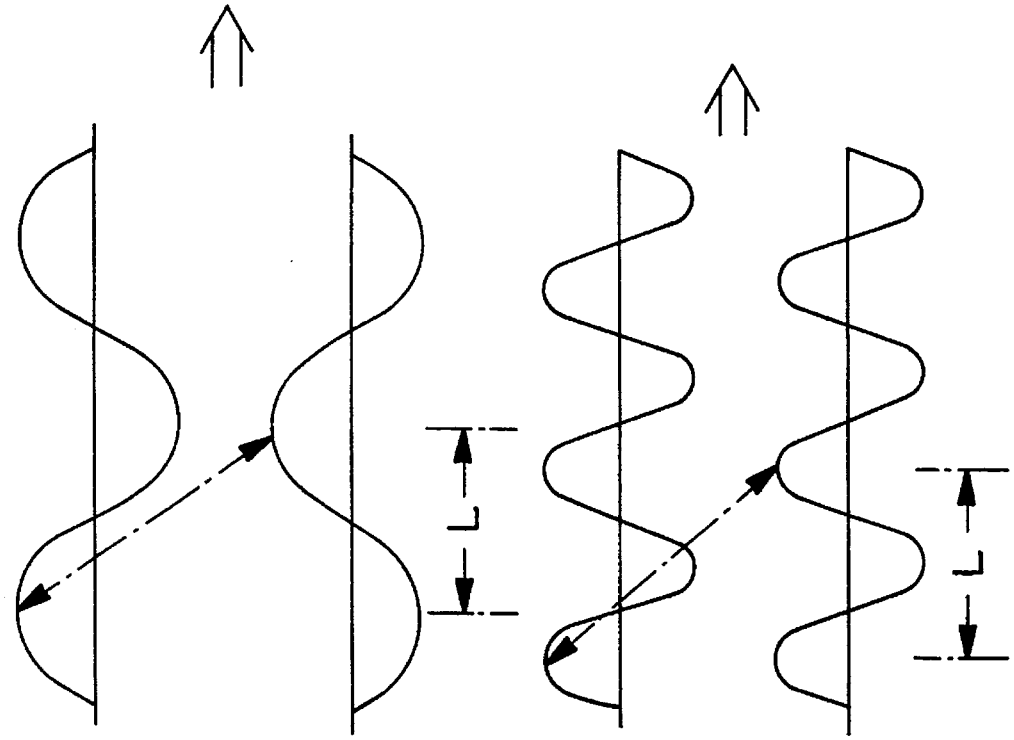

A preferred embodiment of the present invention will be explained hereinunder. The content is expressed by weight %.

RELATION OF COLOR TONE AND LAYER THICKNESS

The relation between the thickness of the aluminum compound layer and the color tone is explained hereinafter.

Red pigments having various layer thicknesses of the aluminum compound is produced by the following method and the resultant color tone was examined.

100 g of commercially available muscovite (the average particle size 30 μm) is dispersed in 500 ml of water. 10 wt % of ferric chloride (6 hydrate) is added at 5 ml/min., heated at 90° C. and stirred. 0.5N sodium hydroxide solution is added to maintain the pH of the system to 4.5–5.0 until ending the reaction. The product is filtrated, dried and heated at 500° C. for 2 hours. As a result, iron oxide coated mica is obtained.

100 g of the iron oxide coated mica, aluminum sulfate (14 hydrate) and 200 g of urea is dispersed in 1000 ml of water, heated and stirred for 4 hours in boiling conditions. After being washed with water, filtered and dried, the aluminum oxide coated iron oxide coated mica is obtained by heating at 500° C. in the atmosphere.

The color tone was examined by the following method. Namely, 5 g of the red pigments are filled to the quartz cell which is for measurement of the color tone of powder. After orientation of the pigments, the pigments are pressed at a constant pressure and samples of the measurements are obtained. Next, the samples are measured with a spectrum colorimetry measuring apparatus (HITACHI C-2000).

The thickness of the layer is indicated by the optical thickness of the layer.

TABLE 1

| Ferric chloride content; 33.75 g Thickness of iron oxide layer; 30 nm | | | | | | | |
|---|---|---|---|---|---|---|---|
| Aluminum sulfate content (g) | 0 | 31 | 95 | 160 | 220 | 315 | 380 |
| Aluminum oxide layer thickness (nm) | 0 | 50 | 150 | 250 | 350 | 500 | 600 |
| H.V./C | 3.0R 3.8/ 6.80 | 3.8R 4.3/ 6.81 | 4.BR 4.98/ 7.06 | 3.9R 5.16/ 7.62 | 4.0R 5.18/ 7.40 | 4.5R 5.0/ 6.60 | 3.0R 4.44/ 1.00 |

TABLE 2

Ferric chloride content; 45.0 g
Thickness of iron oxide layer; 60 nm

| Aluminum sulfate content (g) | 0 | 31 | 95 | 160 | 220 | 315 | 380 |
|---|---|---|---|---|---|---|---|
| Aluminum oxide layer thickness (nm) | 0 | 50 | 150 | 250 | 350 | 500 | 600 |
| H.V./C | | 3.5R 3.34/ 6.92 | 3.7R 3.60/ 6.95 | 8.4R 4.42/ 7.78 | 2.3R 4.81/ 8.31 | 7.4R 4.80/ 8.16 | 7.0R 4.69/ 7.54 | 5.3R 4.00/ 6.06 |

TABLE 3

Ferric chloride content; 120.0 g
Thickness of iron oxide layer; 70 nm

| Aluminum sulfate content (g) | 0 | 31 | 95 | 160 | 220 | 315 | 380 |
|---|---|---|---|---|---|---|---|
| Aluminum oxide layer thickness (nm) | 0 | 50 | 150 | 250 | 350 | 500 | 600 |
| H.V./C | | 3.5R 3.19/ 6.90 | 3.7R 3.30/ 6.90 | 8.5R 4.08/ 7.88 | 0.3R 4.80/ 8.48 | 6.4R 4.90/ 8.22 | 5.7R 4.42/ 7.50 | 3.5R 3.48/ 6.10 |

TABLE 4

Ferric chloride content; 200.0 g
Thickness of iron oxide layer; 250 nm

| Aluminum sulfate content (g) | 0 | 31 | 95 | 160 | 220 | 315 | 380 |
|---|---|---|---|---|---|---|---|
| Aluminum oxide layer thickness (nm) | 0 | 50 | 150 | 250 | 350 | 500 | 600 |
| H.V./C | | 3.5R 3.00/ 7.00 | 3.7R 3.12/ 7.05 | 7.1R 4.01/ 8.10 | 9.3RP 4.44/ 8.52 | 6.1R 4.81/ 8.33 | 5.3R 4.01/ 8.14 | 3.0R 3.08/ 6.22 |

TABLE 5

Ferric chloride content; 260.0 g
Thickness of iron oxide layer; 350 nm

| Aluminum sulfate content (g) | 0 | 31 | 95 | 160 | 220 | 315 | 380 |
|---|---|---|---|---|---|---|---|
| Aluminum oxide layer thickness (nm) | 0 | 50 | 150 | 250 | 350 | 500 | 600 |
| H.V./C | | 3.5R 2.80/ 6.85 | 3.8R 2.84/ 6.86 | 8.0R 3.23/ 7.60 | 0.8R 4.12/ 8.28 | 6.0R 4.36/ 8.15 | 6.0R 3.43/ 7.40 | 4.0R 2.80/ 6.18 |

TABLE 6

Ferric chloride content; 350.0 g
Thickness of iron oxide layer; 450 nm

| Aluminum sulfate content (g) | 0 | 31 | 95 | 160 | 220 | 315 | 380 |
|---|---|---|---|---|---|---|---|
| Aluminum oxide layer thickness (nm) | 0 | 50 | 150 | 250 | 350 | 500 | 600 |
| H.V./C | | 3.8R 2.40/ 6.20 | 4.0R 2.42/ 6.44 | 4.5R 2.72/ 6.56 | 4.1R 3.02/ 6.62 | 4.0R 3.18/ 6.46 | 3.9R 3.06/ 6.10 | 3.1R 3.06/ 5.68 |

As described above, it is not possible to obtain an excellent red color if the iron oxide layer is less than 60 nm.

Also, if the layer thickness of aluminum oxide is less than 150 nm, the color tone which iron oxide has is emphasized; and it is not possible to adjust the color tone.

As described above, by coating the colorless or white aluminum oxide on the iron oxide coated mica, of which the color is brown-red, it is possible to obtain a pigment having a very sharp color and various color tones.

EXAMPLE 1

100 g of commercially available muscovite is dispersed in 500 ml of water. 10 wt % of ferric chloride (6 hydrate) is added at 5 ml per minute while heating the system to 90° C., and stirring. 0.5 N sodium hydroxide solution is added to maintain the pH of the system to 4.5–5.0 until ending of the reaction. The product is filtrated, dried and heated at 500° C. for 2 hours. As a result, 136 g of iron oxide coated mica is obtained.

100 g of the iron oxide coated mica, 175 g of aluminum sulfate (14 hydrate) and 200 g of urea is dispersed in 1000 ml of water, heated and stirred for 4 hours in boiling conditions. After washing by water, filtering and drying, 127 g of the aluminum oxide coated iron oxide coated mica is obtained by heating at 500° C. in the atmosphere.

The obtained powder had a vivid color appearance and luster of purple-red.

EXAMPLE 2

100 g of commercially available iron oxide coated mica (MERCK: IRIODIN 524), 233 g of aluminum sulfate (14 hydrate) and 250 g of urea is dispersed in 1000 ml of water, heated and stirred for 4 hours under boiling conditions. After washing by water, filtering and drying, 138 g of the aluminum oxide coated iron oxide coated mica is obtained by heating at 400° C. in the atmosphere.

The obtained powder has a vivid color appearance and luster of blue-red.

EXAMPLE 3

100 g of commercially available muscovite is dispersed in 500 ml of water. 20 ml of 2M titanium sulfate was added, heated to 90° C., and stirred. After washing by water, filtering, and drying, 101 g of the iron oxide coated mica is obtained.

30 g of the titanium oxide coated mica is dispersed in 300 ml of water, 1000 ml of 10 weight % ferric chloride (6 hydrate) was added at 5 ml/min. At this time, 0.5N sodium hydroxide solution was added to maintain the pH of the system to 4.5–5.0. After filtering and drying, 57.0 g of the iron oxide coated titanium oxide coated mica is obtained by heating at 500° C. for 2 hours.

50 g of the iron oxide coated mica, 100 g of aluminum chloride (6 hydrate) and 100 g of urea is dispersed in 500 ml of water, heated and stirred for 4 hours at boiling conditions. After washing by water, filtering and drying, 61 g of the aluminum oxide coated iron oxide coated titanium oxide coated mica is obtained by heating at 400° C. in the atmosphere.

The obtained powder had a vivid color appearance and luster of orange.

EXAMPLE 4

100 g of commercially available iron oxide coated mica (MERCK:IRIODIN 524), 260 g of aluminum sulfate (14 hydrate), 20 g of ferric chloride and 300 g of urea is dispersed in 1000 ml of water, heated and stirred for 4 hours at boiling conditions. After washing by water, filtering and drying, 146 g of the aluminum oxide coated iron oxide coated mica is obtained by heating at 400° C. in the atmosphere.

The obtained powder had a vivid color appearance and a luster of blue-red.

EXAMPLE 5

50 g of commercially available iron oxide coated mica (MERCK:IRIODIN 524) was dispersed in 500 ml of water. 2000 ml of 10 wt % aluminum sulfate (14 hydrate) solution was added at 10 ml/min. under heating and stirring conditions while the pH of the system was maintained at 4.5–5.0 by adding 1N-sodium hydroxide solution. After washing by water, filtering and drying, 65 g of aluminum oxide coated iron oxide coated mica is obtained by heating at 400° C. in the atmosphere.

The obtained powder had a vivid color appearance and a luster of blue-red.

EXAMPLE 6

100 g of commercially available titanium oxide coated mica (MERCK:IRIODIN 215) was dispersed in 500 ml of water and 2000 ml of 10 wt % ferric chloride (6 hydrate) solution was added in the system at 5 ml/min. heated at 90° C. and stirred. At this time, the pH of the system was maintained at 4.5 to 5.0 by adding 0.5N sodium hydroxide solution. After filtering and drying, 160 g of the iron oxide coated titanium oxide coated mica is obtained by heating at 500° C. for 2 hours.

100 g of the ion oxide coated titanium oxide coated mica, 175 g of aluminum sulfate (14 hydrate) and 200 g of urea is dispersed in 1000 ml of water, heated and stirred for 4 hours under boiling conditions. After washing by water, filtering and drying, 123 g of the aluminum oxide coated iron oxide coated mica is obtained by heating at 500° C. in the atmosphere.

The obtained powder had a vivid color appearance and a luster of orange.

EXAMPLE 7

100 g of commercially available kaolinite, 100 g of ferric chloride (6 hydrate) and 150 g of urea is dispersed in 1000 ml of water, heated at 90° C. and stirred for 4 hours under the same condition. After filtering and drying, 127 g of the iron oxide coated kaolinite was obtained.

100 g of the iron oxide coated kaolinite, 120 g of aluminum sulfate (14 hydrate) and 250 g of urea is dispersed in 1000 ml of water, heated and stirred for 4 hours under boiling conditions. After washing with water, filtering and drying, 116 g of the aluminum oxide coated iron oxide coated kaolinite is obtained by heating at 500° C. in the atmosphere.

The obtained powder had a vivid color appearance and luster of mandarin-orange.

The obtained red pigments according to Examples 1 to 7 are examined as described hereinafter.

For comparisons, commercially available colored titanium oxide coated mica (iron oxide coated mica and carmine added titanium oxide coated mica) were examined using the same method.

The examination is conducted as to the appearance of the color tone, acid stability, alkaline stability, light stability, and heat stability. Methods of examination and examination results are shown below.

1. Appearance of color tone 5 g of the red pigments according to the present invention and commercially available colored titanium oxide coated mica are filled in quartz cells which are for the powder color tone measurement. After sufficient orientation, the powder is pressed at a constant pressure and samples for measurement are obtained.

The samples are measured for colorimetry by the spectrum colorimetry machine (HITACHI C-2000).

The colorimetry is indicated as an average, after three examinations.

2. Acid stability 1.5 g of the red pigments according to the present invention and commercially available colored titanium oxide coated mica is filled in 50 ml stopper test tubes. 30 ml of 2-N hydrochloric acid solutions are added to the test tubes. After dispersion, the test tubes are placed upright on a test tube stand, and the color tone is examined after 24 hours.

3. Alkaline stability 1.5 g of the red pigments according to the present invention and commercially available colored titanium oxide coated mica are filled in 50 ml stopper test tubes. 30 ml of 2-N sodium hydroxide solutions are added to the test tubes. After dispersion, the test tubes are placed upright on a test tube stand, and the color tone is examined after 24 hours.

4. Light stability 2.5 g of the red pigments according to the present invention and commercially available colored titanium oxide coated mica are filled in inner plates which are made from the 20 mm square aluminum plate at 3 mm thickness and irradiated by a xenon lamp for 30 hours.

The color tone of the sample before and after irradiation are measured by a spectrum colorimetry machine (HITACHI C-2000) and the obtained color differences ($\Delta E$) before and after irradiation from the colorimetry value were examined.

5. Heat stability 3.0 g of the red pigments according to the present invention and commercially available colored titanium oxide coated mica are filled in porcelain crucibles and heated at 400° C. for 2 hours in the atmosphere.

The color tone of the sample before and after the heating treatment are measured by a spectrum colorimetry machine (HITACHI C-2000) and the color differences ($\Delta E$) before and after the heating treatment from the colorimetry value were examined.

The results of each stability examination are shown in Table 8.

TABLE 7

| Pigment to have used for comparison | | |
| --- | --- | --- |
| Comparison 1 | Chroizone rouge franbe | $TiO_2$ + Mica + $Fe_2O_3$ |
| Comparison 2 | Chroizone red | $TiO_2$ + Mica + Carmine |

TABLE 8

Result of color tone and stability

|  | Color tone H.V./C. | Stability | | | |
|---|---|---|---|---|---|
|  |  | acid | alkali | light | heat |
| example |  |  |  |  |  |
| 1 | 0.7R 4.0/8.3 | ⊙ | ⊙ | 0.71 | 0.81 |
| 2 | 8.5RP 4.5/8.2 | ⊙ | ⊙ | 0.74 | 0.65 |
| 3 | 7.0R 4.0/9.0 | ⊙ | ⊙ | 0.82 | 0.74 |
| 4 | 9.0RP 4.2/8.2 | ⊙ | ⊙ | 0.77 | 0.35 |
| 5 | 0.5R 4.5/8.0 | ⊙ | ⊙ | 0.60 | 0.55 |
| 6 | 7.5R 4.8/8.1 | ⊙ | ⊙ | 0.79 | 0.75 |
| 7 | 8.0R 3.8/7.1 | ⊙ | ⊙ | 0.65 | 0.88 |
| Comparison |  |  |  |  |  |
| 1 | 2.8R 4.9/6.9 | ○ | ⊙ | 0.77 | 0.83 |
| 2 | 2.3RP 5.4/7.5 | X | X | 22.1 | 40.3 |

Evaluation standard:
⊙ discoloration never admitted and a high stability.
○ discoloration is rather admitted but has the good stability
X Discoloration is admitted and the stability is low.

As is clear from the results in Table 2, the red pigment according to the present invention can adjust the color tone from yellow red to blue red by changing the content ratio of the iron oxide and the aluminum compound by which the plate-type particles are coated.

Also, the chroma of the red pigment according to the present invention is equal to or higher than that of the chroizone red for comparison 2 in which an organic substance is added.

An inorganic pigment in which the chroma equals that of an organic pigment is very rare. Therefore, it is obvious that the color tone of the red plate-type pigment according to the present invention is excellent in comparison to the other inorganic pigment.

As is clear from Table 8, the stability of the red pigment according to the present invention has the same or excellent stability in comparison to the commercially available coated iron oxide mica in Comparison 1.

Moreover, the acid stability of the red pigment according to the present invention is excellent rather than commercially available iron oxide coated mica because the acid dissolves the iron oxide from the surface of the commercially available iron oxide coated mica. On the other hand, a particle surface of the red pigment according to the present invention is fully coated with the aluminum oxide which is excellent for acid stability.

Also, the stability of the mica titanium in Comparison 2, in which carmine was added, is not good under severe conditions because the stability of the carmine is bad.

As described above, the red pigment according to the present invention has excellent color tone with high chroma from orange to blue-red and, moreover, excellent stability by coating the surface of plate-type iron oxide.

While there has been described what is at present considered to be a preferred embodiment of the invention, it should be understood that various modifications may be made thereto, and it is intended that the appended claims cover all such modifications which fall within the true spirit and scope of the invention.

What is claimed is:

1. A red pigment comprising:

a plate-shaped particle, an iron oxide layer formed on said plate-shaped particle, an aluminum compound layer on said iron oxide layer, said aluminum compound consisting essentially of at least aluminum oxide, said aluminum compound layer further comprising iron oxide, said iron oxide layer having an optical thickness of from about 60 to 350 nm, and the aluminum compound layer having an optical thickness of from about 150 to 500 nm.

2. A red pigment according to claim 1, wherein said aluminum compound layer contains 1–20 weight % of iron oxide and/or compound of iron oxide-alumina.

3. A method of manufacturing a red pigment comprising:

forming an iron oxide coated plate-shaped particle having from about 20 to 100 weight % of iron oxide, based on the particle to be coated, by coating a plate-shaped particle using a coating bath containing an iron oxide precursor, subsequently forming an aluminum and iron containing layer having an aluminum compound content of from about 15 to 60 weight %, based on the iron oxide coated plate-shaped particle, by coating said particles using a coating bath containing precursors of the aluminum and iron compounds, and heating the resulting coated plate-shaped particle from about 100° to 900° C.

4. A manufacturing method according to claim 3, wherein a precursor of iron oxide is added to the coating bath of aluminum compound so as to produce a coating layer having 1 to 20 weight % of iron oxide and/or iron oxide-aluminum compound.

5. A red pigment according to claim 1, wherein the plate-shaped particle is mica.

6. A red pigment according to claim 1, wherein the iron oxide coated plate-shaped particle has an iron oxide content of from about 20 to 100 weight % based on the weight of the plate-shaped particle prior to coating.

7. A red pigment according to claim 1, wherein the particle diameter is from about 1 to 50 μm and the shape is flat.

* * * * *